US006490136B1

(12) United States Patent
Ito et al.

(10) Patent No.: US 6,490,136 B1
(45) Date of Patent: Dec. 3, 2002

(54) MAGNETIC HEAD, MANUFACTURING METHOD THEREOF, AND MAGNETIC DISK DRIVE

(75) Inventors: Wataru Ito, Tokyo (JP); Minoru Tanaka, Chiba (JP); Hideaki Hayasaka, Miyagi (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 09/710,136

(22) Filed: Nov. 10, 2000

(30) Foreign Application Priority Data

Nov. 12, 1999 (JP) ............................................. 11-323451

(51) Int. Cl.[7] .............................................. G11B 17/32
(52) U.S. Cl. ..................................................... 360/236.4
(58) Field of Search ................................ 369/236–236.9

(56) References Cited

U.S. PATENT DOCUMENTS

| 4,218,715 A | * | 8/1980 | Garnier ................... 360/236.1 |
| 4,939,603 A | * | 7/1990 | Inumochi ................. 360/236.6 |
| 5,301,077 A | * | 4/1994 | Yamaguchi et al. ..... 360/236.7 |

* cited by examiner

Primary Examiner—Allen Cao
(74) Attorney, Agent, or Firm—Jay H. Maioli (57) ABSTRACT

A slider 1 is provided with a magnetic head element for recording or reading signals from a magnetic disk. On this slider, a chamfer is formed by polishing between a rear end of a ramp edge and a front end edge of a rail's principal plane. This construction can sufficiently suppress slider abrasion due to a contact between the disk and the slider, prevent the generation of dust due to the abrasion, and permit satisfactory recording and reproduction of information signals on the magnetic disk.

10 Claims, 8 Drawing Sheets

FIG.1

(PRIOR ART)

MAGNETIC HEAD, MANUFACTURING METHOD THEREOF, AND MAGNETIC DISK DRIVE

BACKGROUND OF THE INVENTION

1. Technical Field

The present invention relates to a magnetic head for recording or reproducing information signals from a magnetic disk. The present invention also relates to a magnetic disk drive having such a magnetic head.

2. Prior Art

Conventionally, a removable disk recording media is proposed to be a large-capacity magnetic disk or floppy disk having several tens or hundreds of megabytes of storage space. Providing a large-capacity removable magnetic disk requires accumulation of various technologies such as recording media materials, structures of magnetic head elements (head chips), reproduction signal processing, the use of tracking servo, and the like.

A so-called floating-type magnetic head is proposed to be provided on a magnetic disk drive which records or reproduces information signal using a large-capacity magnetic disk. The floating magnetic head slightly floats over the recording surface of a fast rotating magnetic disk for recording and reproducing data.

Figure 4:
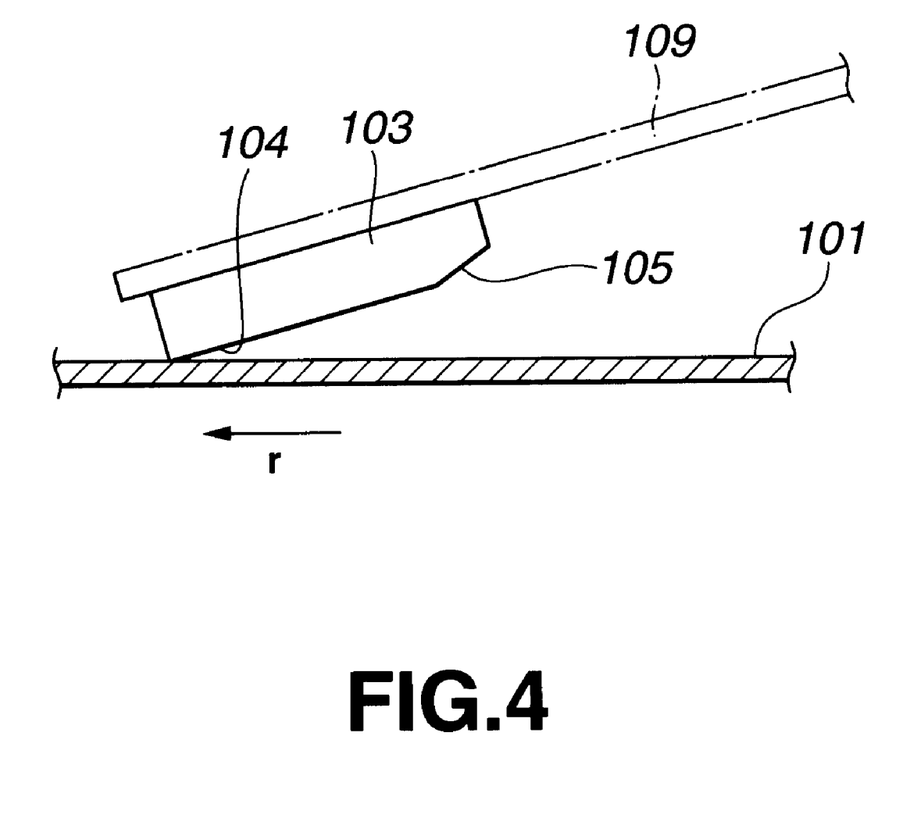
FIG. 4 is a partially sectional side view showing the use of a magnetic head in a magnetic disk drive.

The floating magnetic head comprises a magnetic head element and a slider in which the magnetic head element is embedded. As shown in FIG. 4, the magnetic head is supported by a suspension arm 109. When a magnetic disk 101 fast rotates in the direction of the arrow r in FIG. 4, an air stream occurs and applies a pressure to a slider 103 to float the magnetic disk 101. Floating over the magnetic disk 101, the magnetic head writes or reads information signals from the magnetic disk 101.

Figure 1:
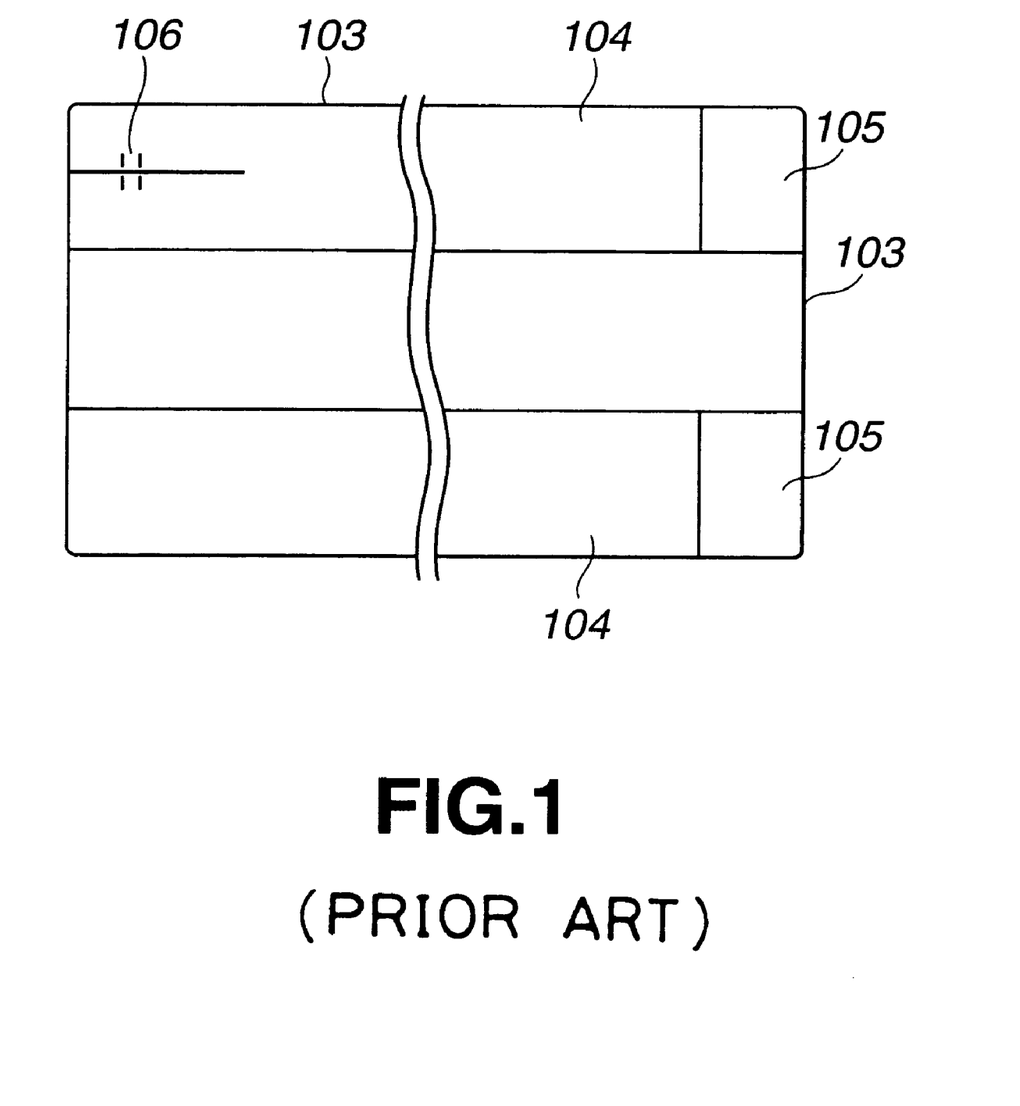
FIG. 1 is a plan view showing a configuration of a conventional magnetic head.

For the above-mentioned magnetic head, the slider needs to stably float over the magnetic disk. For this purpose, as shown in FIG. 1, the slider 103 is provided with a pair of rails 104 on an opposite surface thereof facing against the signal recording surface of the magnetic disk. These rails 104 are parallel to the tangential direction of a recording track on the signal recording surface. Tapered ramp edges 105 are formed so as to leave from the signal recording surface at front ends of these rails 104 in the relative movement direction against the signal recording surface. These ramp edges 105 let an air stream generated by magnetic disk rotation stably flow between the magnetic disk and the slider. A magnetic head element 106 is embedded in the rail 104 at a rear end of the slider 103.

Figure 2:
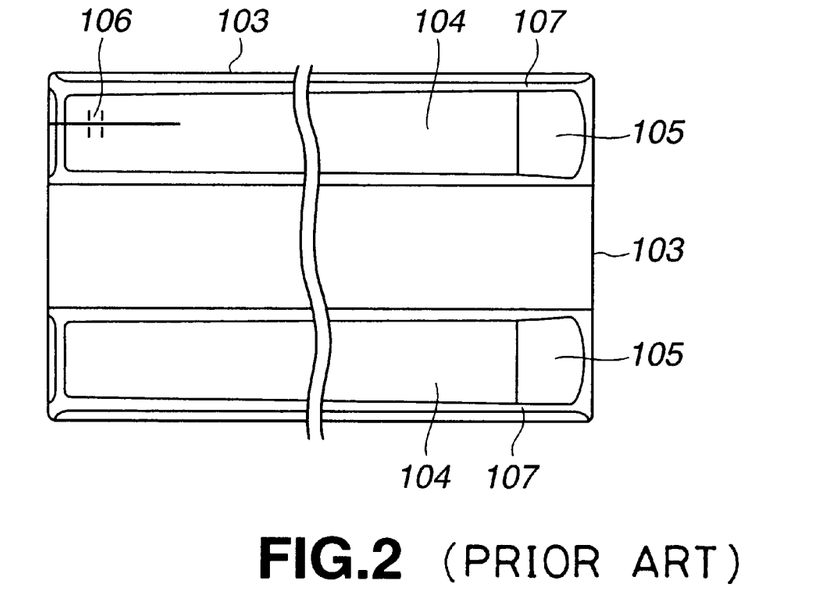
FIG. 2 is a plan view showing a conventional magnetic head to which polishing is applied.

As shown in FIG. 2, each side edge of the rail 104 is polished by means of blending to form a chamfer 107 on the slider 103. If no polishing is applied, the slider edged will form a sharp ridge. The ridge may damage a magnetic disk. Alternatively, the ridge or its vicinity may break to generate dust.

Figure 3:
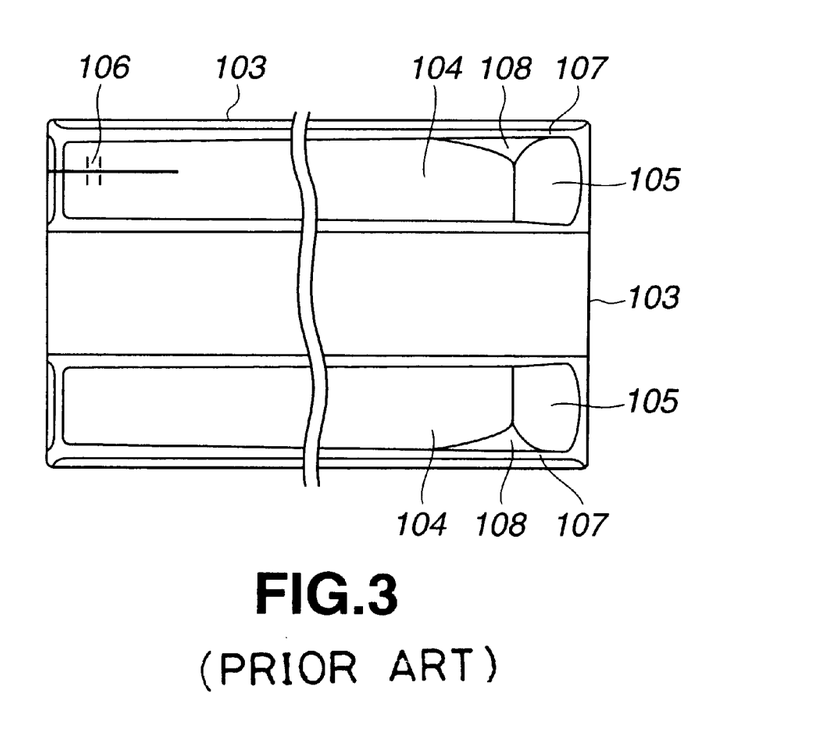
FIG. 3 is a plan view showing that a conventional is abraded after use.

As shown in FIG. 3, the slider is worn by contacting or sliding touchingly on a large-capacity magnetic disk when recording or reproducing information signals. Especially, an abrasion occurs near ridges between rear ends of the ramp edges 105 and principal planes of the rails 104 or at rear sides thereof. Such an abrasion may form a wear portion outside ridges between rear ends of the ramp edges 105 and principal planes of the rails 104.

When such an abrasion deforms the slider, an accurate positional relationship cannot be maintained between the magnetic head element 106 and the magnetic disk, disallowing proper recording or reproducing information signals on the magnetic disk. Dust particles generated by the abrasion may be accumulated on the slider surface to damage the magnetic disk or magnetic head element. Such dust particles may increase a friction between the slider and the magnetic disk or damage the magnetic disk. Further, this may increase a load on a motor which rotates the magnetic disk, thus shortening the motor life or increasing the overall power consumption.

BRIEF SUMMARY OF THE INVENTION

It is therefore an object of the present invention to provide a magnetic head which can sufficiently suppress slider abrasion, prevent the generation of dust due to the abrasion, and permit satisfactory recording and reproduction of information signals on the magnetic disk. It is another object of the present invention to provide a manufacturing method of such a magnetic head and a magnetic disk drive having such a magnetic head.

A magnetic head according to this invention, comprising: a slider having an opposite surface against a signal recording surface on a rotated magnetic disk; a pair of parallel rails protuberantly provided on this opposite surface in parallel with a tangential direction of a recording track on said signal recording surface; a tapered ramp edge on each of these rails at a front end edge in a relative movement direction with a slant leaving from said signal recording surface; and a magnetic head element provided on said slider's rail, wherein: said slider is provided with a chamfer formed by means of polishing between a rear end of said ramp edge and a front end edge of said rail's principal plane.

A manufacturing method of a magnetic head according to this invention, wherein said magnetic head comprising a slider having an opposite surface against a signal recording surface on a rotated magnetic disk, a pair of parallel rails protuberantly provided on this opposite surface in parallel with a tangential direction of a recording track on said signal recording surface, a tapered ramp edge on each of these rails at a front end edge in a relative movement direction with a slant leaving from said signal recording surface, and a magnetic head element provided on this slider's rail, wherein: polishing is applied to form a chamfer at a ridge formed between a rear end of said ramp edge on said slider and a front edge of a principal plane on said rail and each rail's side edge is also polished to form a chamfer; and said chamfer at a front end of said rail in a relative movement direction against a signal recording surface is made wider than said chamfer at a rear end in said relative movement direction.

A magnetic disk drive according to this invention, comprising: a rotating mechanism for rotating a magnetic disk; and a head support mechanism for supporting a magnetic head to be faced against a signal recording surface of a magnetic disk rotated by said rotating mechanism; wherein said magnetic head comprises an opposite surface against a signal recording surface of said magnetic disk, a pair of parallel rails protuberantly provided on this opposite surface in parallel with a tangential direction of a recording track on said signal recording surface, a slider having a tapered ramp edge formed on each of these rails at a front end in a relative movement direction with a slant leaving from said signal recording surface, and a magnetic head element provided on this slider's rail, wherein said slider is provided with a chamfer formed by means of polishing between a rear end of said ramp edge and a front end of said rail's principal plane.

As mentioned above, a magnetic head according to the present invention is provided with a slider which has a chamfer formed between a rear end of a ramp edge and a front end edge of a rail's principal plane.

A manufacturing method of the magnetic head according to the present invention forms a chamfer by polishing a ridge formed between the rear end of the slider's ramp edge and the front end edge of the rail's principal plane. In addition, a chamfer is formed by polishing each rail's side edge. With reference to a signal recording surface, the chamfer at the front end side of each rail in the relative movement direction is made wider than a flat face at the rear end side thereof in the same direction. A magnetic head of the magnetic disk drive according to the present invention comprises a slider having a chamfer formed between the rear end of the slider's ramp edge and the front end edge of the rail's principal plane.

Namely, even when a large-capacity magnetic disk is used, the present invention can provide a magnetic head which can sufficiently suppress slider abrasion, prevent the generation of dust due to the abrasion, and permit satisfactory recording and reproduction of information signals on the magnetic disk. The present invention can also provide a manufacturing method of such a magnetic head and a magnetic disk drive having such a magnetic head.

DETAILED DESCRIPTION OF THE INVENTION

Embodiments of the present invention will be described in further detail with reference to the accompanying drawings.

A magnetic disk drive according to the present invention having a magnetic head according to the present invention records and reproduces information signals using a magnetic disk, namely a so-called floppy disk, as a recording medium. The relevant magnetic disk comprises a synthetic resin base material coated with a magnetic material and has a maximum projection height of approximately 100 nm on the signal recording surface. The magnetic disk can provide a recording capacity ranging from several tens of megabytes (MB) to several hundreds of megabytes.

Figure 5:
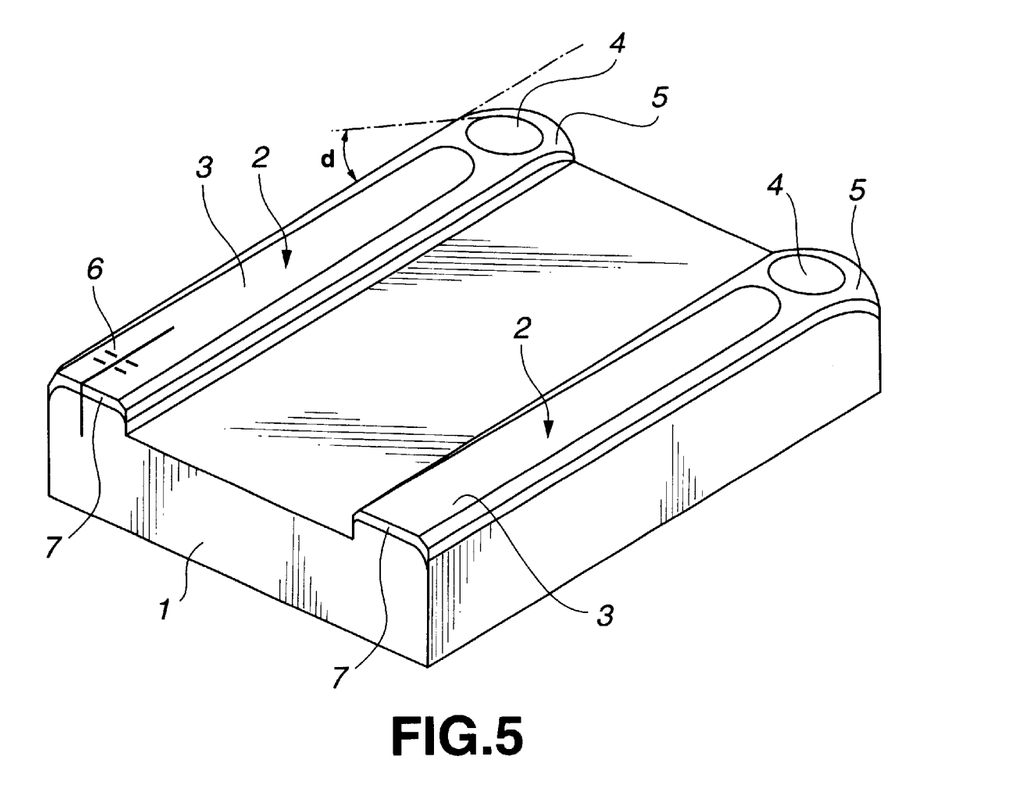
FIG. 5 is a perspective view showing a configuration of a magnetic head according to the present invention.

As shown in FIG. 5, the magnetic head according to the present invention has an opposite surface against a signal recording surface of a magnetic disk rotated by a magnetic disk drive. This opposite surface has a slider 1 protuberantly provided with a pair of parallel rails 2 which are parallel to the tangential direction of a recording track on the signal recording surface. There are formed tapered ramp edges 4 slanted toward a direction leaving from the signal recording surface at front ends of the rails 2 in the relative movement direction against the signal recording surface. A magnetic head element 6 is embedded in the rail 2 of the slider 1 at the rear end in the relative movement direction against the signal recording surface.

The slider 1 is made of a ceramic material such as, say, calcium titanate $Ca_2TiO_3$. Each of ramp edges 4 forms a tilt angle of approximately 20° indicated by an arrow d in FIG. 5. The slider 1 is approximately sized to have a length of 3 mm, a width of 2 mm, and a thickness of 0.8 mm.

Figure 11:
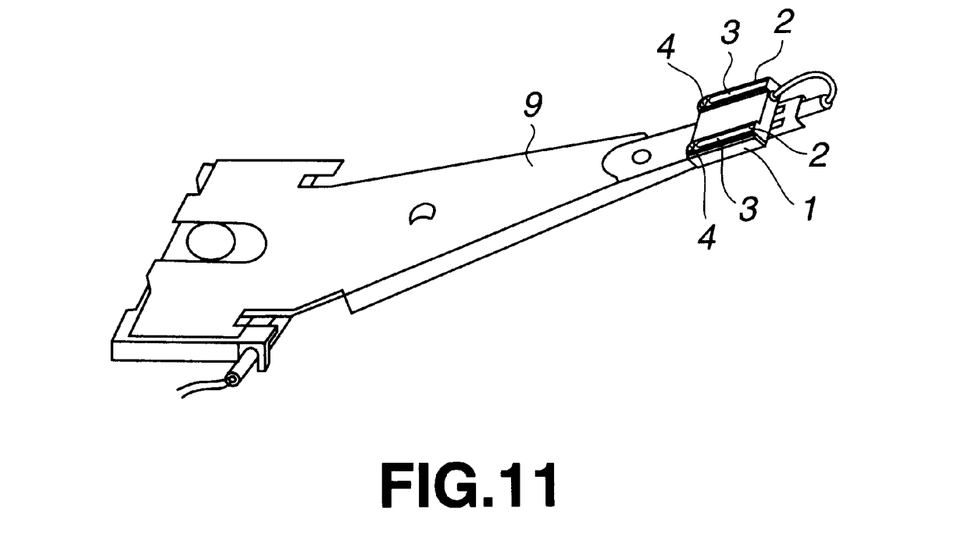
FIG. 11 is a perspective view showing a structure supporting a magnetic head in a magnetic disk drive according to the present invention.

In the magnetic disk drive, the magnetic head is attached to the tip of a suspension arm 9 as shown in FIG. 11.

Figure 12:
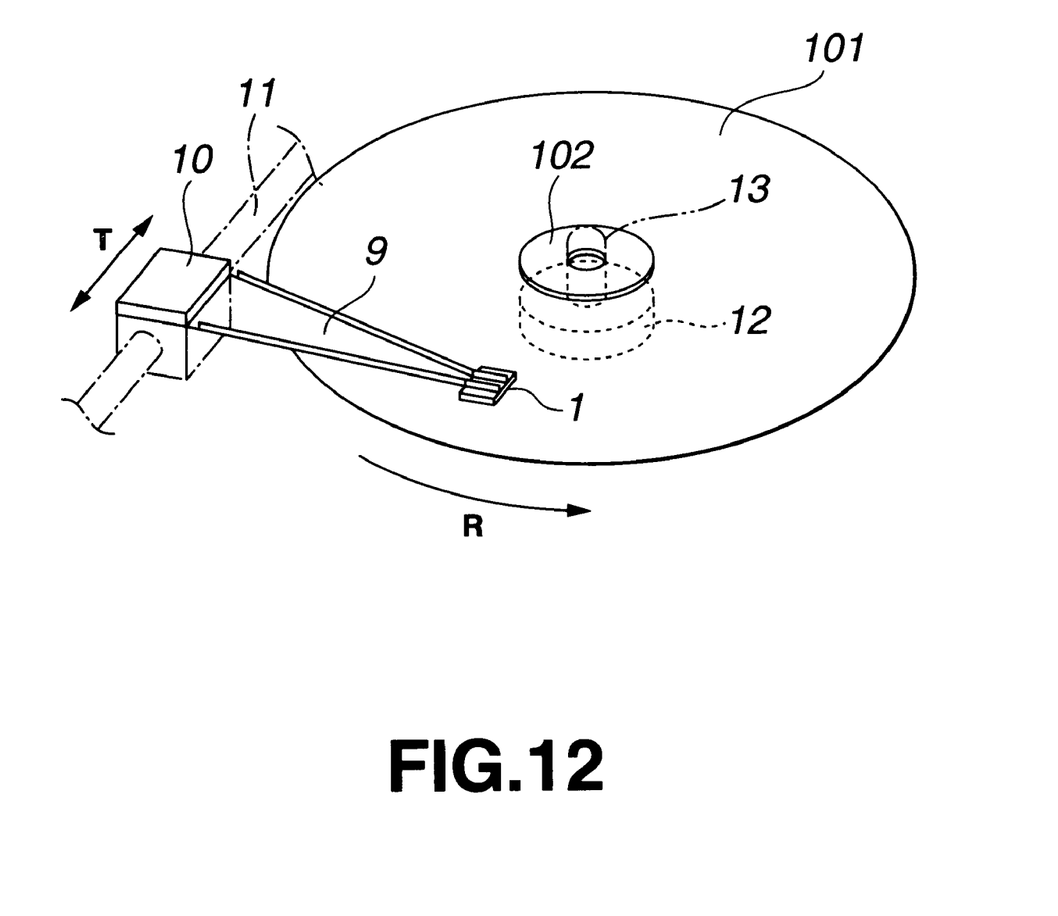
FIG. 12 is a perspective view partially showing the configuration of the magnetic disk drive.

As shown in FIG. 12, the magnetic disk drive is equipped with a spindle motor 12 as a rotating mechanism for rotating a magnetic disk 101. A drive shaft 13 of the spindle motor 12 is provided with a hub 102 installed at the center of the magnetic disk 101. The magnetic disk drive is equipped with a head support mechanism which holds the magnetic head and places it against a signal recording surface of the magnetic disk 101 rotated by the spindle motor 12. The head support mechanism comprises a suspension arm 9 and a support block 10 which supports a base end of the suspension arm 9. In the head support mechanism, the support block 10 is supported by a guide rail 11. The support block 10 is moved along the guide rail 11 as indicated by an arrow T in FIG. 12. The magnetic head is moved in a diametric direction of the magnetic disk 101 rotated by the spindle motor 12. The suspension arm presses the magnetic head against the magnetic disk 101 with a specified load pressure.

The magnetic disk 101 rotates as indicated by an arrow R in FIG. 12, namely in such a direction that a side of the magnetic disk 101 facing toward the base end of the magnetic head's suspension arm 9 will be forward in the relative movement direction with reference to the magnetic disk 101. The magnetic disk 101 rotates to generate an air stream which applies a pressure to the magnetic head's slider 1. Owing to this air pressure, the slider 1 floats over the magnetic disk 101 and is ready for writing and reading information signals from the magnetic disk 101 by means of the magnetic head element 6. At this time, the slider 1's ramp edges 4 allow an air stream generated by rotation of the magnetic disk 101 to stably flow between the magnetic disk 101 and the slider 1.

On the magnetic head's slider 1 as shown in FIG. 5, polishing (blending) is applied to each side edge of the rails 2 to form a chamfer 5. If no polishing is applied, the slider edged will form a sharp ridge. The ridge may damage a magnetic disk 101. Alternatively, the ridge or its vicinity may break to generate dust. Also on the slider 1, the chamfer 5 is provided between the rear end of the ramp edges 4 and the front end of the rails 2's principal planes 3 by means of polishing. The thus formed chamfer 5 provides a width of 1 μm or more indicated by an arrow a in FIG. 8 between the rear end of the ramp edges 4 and the front end of the rails 2's principal planes 3.

Figure 8:
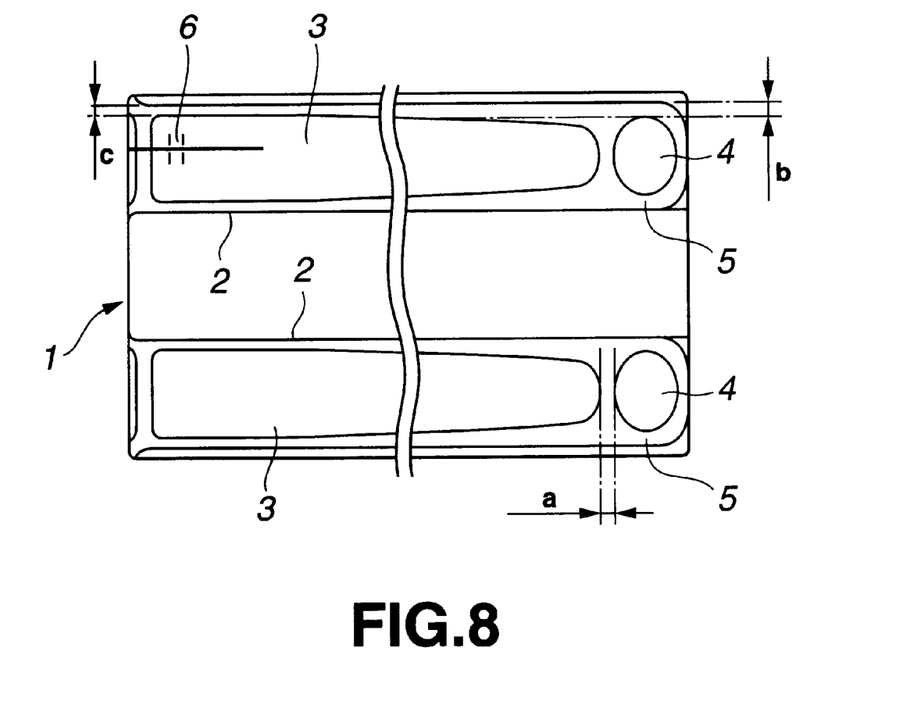
FIG. 8 is a plan view showing a configuration of the magnetic head.

On the slider 1, polishing is also applied to each side edge of the rail 2 to form the chamfer 5. On each of the rails 2, the chamfer 5 at the front end side in the relative movement direction with reference to the signal recording surface is wider than the chamfer 5 at the rear end side in the same direction. This is because a manufacturing process of the slider 1 applies more polishing to the chamfer 5 at the front end side in the relative movement direction with reference to the signal recording surface of each of the rails 2 than to the chamfer 5 at the rear end side in the same direction.

As shown in FIG. 8, polishing is applied to each side edge of the rails 2 on the slider 1 to form the chamfer 5. In FIG. 8, a width indicated by an arrow b corresponds to the front end side in the relative movement direction with reference to the signal recording surface. A width indicated by an arrow c corresponds to the rear end side in the same direction. In this case, the width b is 1.5 through 1.7 times larger than the width c. For example, there is formed the chamfer 5 of approximately 40 μm at the front end side in the relative movement direction with reference to the signal recording surface. There is formed the chamfer 5 of approximately 25 μm at the rear end side in the same direction.

On the slider 1, polishing is applied to form the chamfer 5 at a ridge formed between the each ramp edge 4's rear end and the each principal plane 3's front edge of the each rail 2. Each rail 2's side edge is also polished to form the chamfer 5. Strong polishing is applied to the front end side in the relative movement direction with reference to the signal recording surface on the each rail 2. This forms the chamfer 5 at the front end side wider than the chamfer 5 at the rear end side in the same direction.

Even when information signals are recorded or reproduced on the large-capacity magnetic disk 101, the slider 1 is free from abrasion or aged deterioration between the rear end of the ramp edge 4 each and the rail 2's principal plane 3 each. This makes it possible to maintain accurate positional relationship between the magnetic head element 6 and the magnetic disk 101 for correctly recording and reproducing information signals on the magnetic disk 101.

Figure 9:
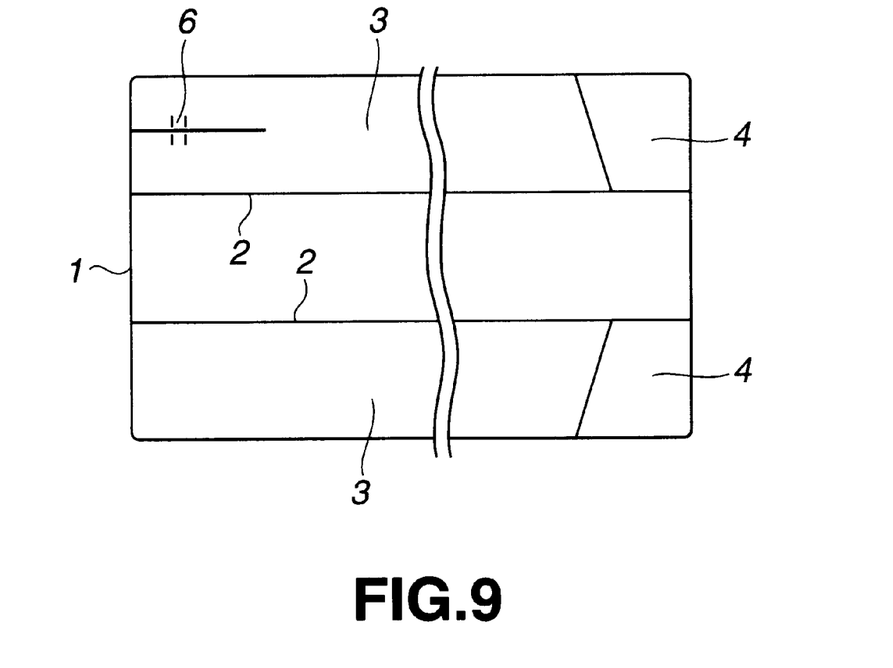
FIG. 9 is a plan view showing another configuration example of the magnetic head.

The above-mentioned abrasion can be prevented by forming a ridge between the each ramp edge 4's rear end and the each rail 2's principal plane 3 as shown in FIG. 9. According to FIG. 9, the slider 1 is formed so that an outer side edge of the slider 1 is slanted backward of the relative movement direction against the signal recording surface.

Figure 10:
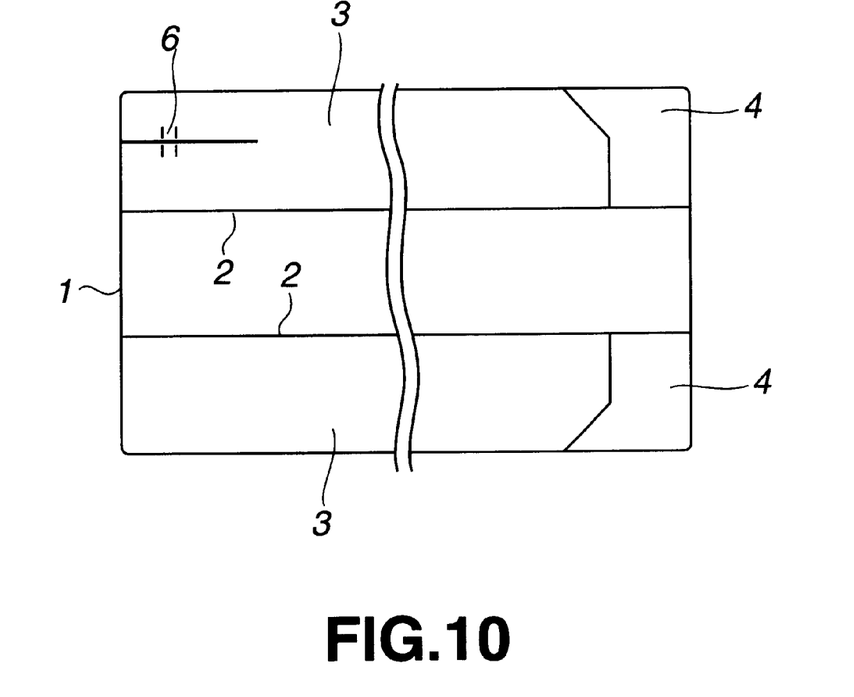
FIG. 10 is a plan view showing yet another configuration example of the magnetic head.

Further, the above-mentioned abrasion can be prevented by forming a ridge between the each ramp edge 4's rear end and the each rail 2's principal plane 3 as shown in FIG. 10. According to FIG. 10, the slider 1 is formed so that an outer side edge of the slider 1 is partly slanted backward of the relative movement direction against the signal recording surface.

With respect to this magnetic head, a diamond like carbon (DLC) film 7 is formed on the slider 1's opposite surface, at least on the principal planes 3 of the rails 2 and on the entire surface of the ramp edges 4. The diamond like carbon is a material having a low friction coefficient, high activity (high surface energy), and high hardness. In addition to the diamond like carbon, such a material may be silica ($SiO_x$), tantalum carbon (Ta—C), and the like.

Figure 6:
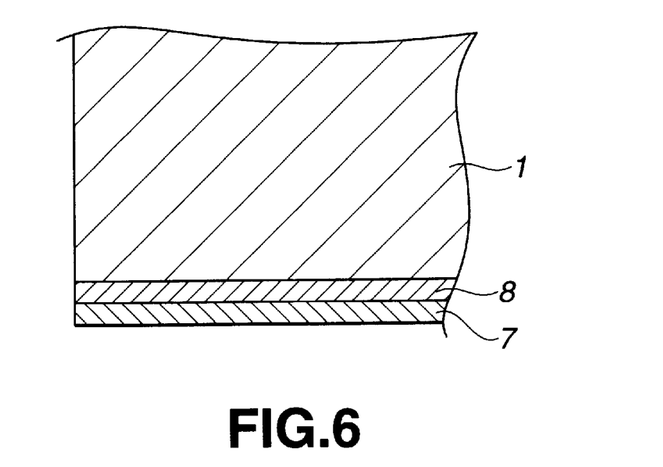
FIG. 6 is a sectional view showing a configuration of part of the magnetic head.
Figure 7:
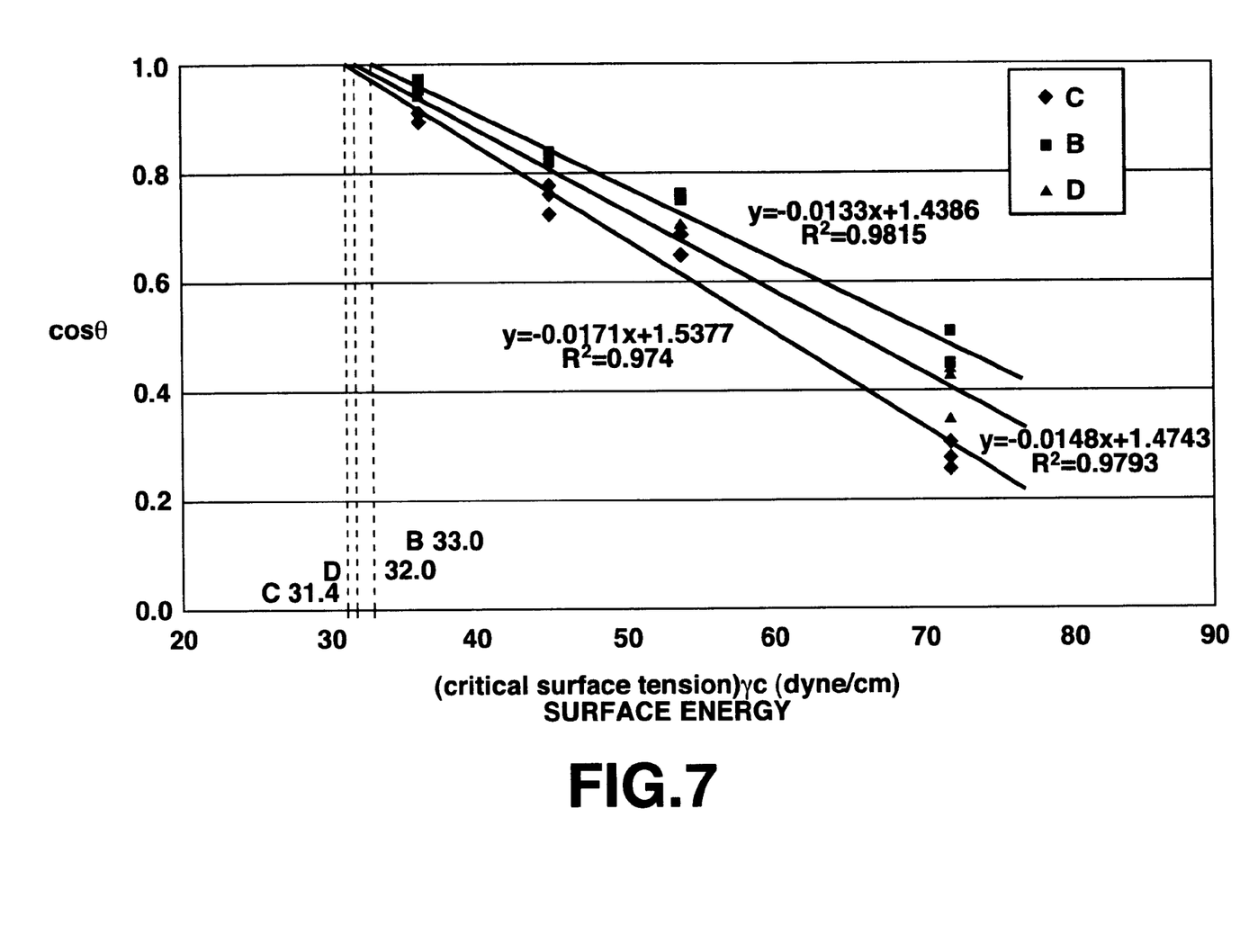
FIG. 7 is a graph used for calculating the critical surface energy of a diamond like carbon film provided on the magnetic head.

As shown in FIG. 6, there is formed a silicon oxide ($SiO_2$) film (base layer) 8 with the thickness of approximately 2 nm on the slider 1's opposite surface. The diamond like carbon film 7 with the thickness of approximately 8 nm thereon.

A diamond like carbon film can be formed by means of the P-CVD method, the pulse sputtering method, the arc vaporization method, and the like. Tables 1, 2, and 3 to follow show characteristics measurements concerning five types of samples A through E for a diamond like carbon film. The sample A is formed with the pulse sputtering method. The samples B, C, and E are formed with the P-CVD method. The sample D is formed with the arc vaporization method.

These samples are measured regarding film thicknesses (nm), integrated intensity ratios (Id/Ig) with the laser wavelength of 457.9 nm, hydrogen-carbon ratios or RBS (H/C), surface hardnesses (GPa), and critical surface energies (dyne/cm). An integrated intensity ratio signifies a ratio of diamond components to graphite components and is measured by the Raman spectroscopy.

TABLE 1

DLC film thickness: 10 nm (on the core slider)

| | A: Pulse sputtering | B: P-CVD | C: P-CVD | D: arc vaporization | E: P-CVD |
|---|---|---|---|---|---|
| a) Film thickness (nm) | 9–12 | | | 3–6 (no base Si) | |
| b) Raman (Id/Ig) by Raman spectroscopy | | | | | |
| c) RBS (H/C): hydrogen-carbon | | | | | |
| d) Integrated intensity | | | | | |
| e) Critical surface energy (dyne/cm) | | | | | |

*The film thickness is measured at $Ca_2TiO_3$.

TABLE 2

DLC film thickness: 10 nm (on the Si wafer)

| | A: pulse sputtering | B: P-CVD | C: P-CVD | D: arc vaporization | E: P-CVD |
|---|---|---|---|---|---|
| a) Film thickness (nm) | | 10.2 | 10.2 | 9.5 | |
| b) Raman (Id/Ig) by Raman spectroscopy | 0.19 | Not detected | Not detected | | 0.34 |
| c) RBS (H/C): hydrogen-carbon | 0.072 | 0.926 | 0.837 | | 0.588 |
| d) Integrated intensity | | | | | |
| e) Critical surface energy (dyne/cm) | 27.7 | 31.4 | 33.0 | 32.0 | |

*Laser wavelength for Raman spectroscopy: 457.9 nm

TABLE 3

DLC film thickness: 20–100 nm (on the Si wafer)

| | A: pulse sputtering | B: P-CVD | C: P-CVD | D: arc vaporization | E: P-CVD |
|---|---|---|---|---|---|
| a) Film thickness (nm) | 500 | 50 | 100 | 100 | 100 |
| b) Raman (Id/Ig) by Raman spectroscopy | 0.48 | 1.66 | 1.12 | 0.42 | 1.06 |

TABLE 3-continued

DLC film thickness: 20–100 nm (on the Si wafer)

| | A: pulse sputtering | B: P-CVD | C: P-CVD | D: arc vaporization | E: P-CVD |
|---|---|---|---|---|---|
| c) RBS (H/C): hydrogen-carbon | 0.021 | 0.661 | 0.995 | | 0.588 |
| d) Integrated intensity | 22 | 18 | 13 | 55 | |
| e) Critical surface energy (dyne/cm) | 25.9 | | | | |

*Laser wavelength for Raman spectroscopy: 514.5 nm

Table 1 shows the film formation on the slider with the film thickness of 10 nm. Table 2 shows the film formation on the silicon wafer with the film thickness of 10 nm. Table 3 shows the film formation on the silicon wafer with the film thicknesses ranging from 20 nm to 100 nm. The surface hardness is based on the size of an indentation created by press of an indenter point. Accordingly, only Table 3 shows surface hardness values because the measurement requires a thick film.

As shown in Table 4, the critical surface energy is measured by applying reagents (No. 36, No. 45, and No. 54) such as ethylene glycol monoethyl ether and pure water ($H_2O$) to the diamond like carbon film and finding contact angles θ (°).

TABLE 4

| | γ (dyne/cm) | B | C | D |
|---|---|---|---|---|
| No. 36 | 36 | 26.26804 | 19.6386 | 16.78585 |
| | | 24.24748 | 14.70476 | 16.31368 |
| | | 25.98923 | 18.92464 | 18.48342 |
| | Average | 25.502 | 17.756 | 17.194 |
| | Standard deviation | 1.095 | 2.666 | 1.141 |
| No. 45 | 36 | 43.60282 | 34.39708 | 39.87084 |
| | | 40.44972 | 32.92003 | 39.30765 |
| | | 38.58009 | 34.39708 | 39.30765 |
| | Average | 40.878 | 33.905 | 39.495 |
| | Standard deviation | 2.539 | 0.853 | 0.325 |
| No. 54 | 36 | 49.72739 | 40.83026 | 45.42882 |
| | | 46.39718 | 41.34025 | 46.14888 |
| | | 47.17406 | 41.34025 | 46.39718 |
| | Average | 47.766 | 41.170 | 45.992 |
| | Standard Average | 1.742 | 0.294 | 0.503 |
| $H_2O$ | 36 | 73.05771 | 59.96328 | 70.26839 |
| | | 74.5328 | 63.93329 | 65.23849 |
| | | 75.74997 | 64.30459 | 65.23849 |
| | Average | 74.447 | 62.734 | 66.915 |
| | Standard deviation | 1.348 | 2.406 | 2.904 |

Based on the contact angles in Table 4, Zismanplot is conducted to find critical surface energies (dyne/cm) as shown in Table 5.

TABLE 5

| rc (dyne/cm) | | | |
|---|---|---|---|
| A | B | C | D |
| 27.7 | 31.4 | 33.0 | 32.0 |

Table 6 lists average values used for contact angles.

TABLE 6

| | | | Contact angle (°) | | | |
|---|---|---|---|---|---|---|
| Reagent | γ (dyne/cm) | $Ca_2TiO_3$ substrate | A | B | C | D |
| No.36 *1 | 36 | — | — | 25.5 | 17.8 | 17.2 |
| No.45 *1 | 45 | — | — | 40.9 | 33.9 | 39.5 |
| Pure water | — | 30 | 50 | 74.4 | 62.7 | 66.9 |

*1: ethylene glycol monoethyl ether

Based on these measurement results, an examination was conducted concerning a material capable of having a sufficient critical surface energy to prevent a liquid from adhering to the slider, satisfactorily suppressing abrasion to the slider 1 which permits the use of a magnetic disk with a recording capacity of approximately 200 megabytes, having a friction coefficient to sufficiently decrease a frictional force with the magnetic disk, and providing strong adherence to the base layer ($SiO_2$ film).

Strong critical surface energies are available in the order of samples A, C, D, and B. These critical surface energies are higher than those for a ceramic material such as calcium titanate ($Ca_2TiO_3$) which is a material for the slider 1. These samples are found to be effective for forming a diamond like carbon film.

With respect to the surface hardness, the samples A and D are slightly superior to the samples C and B. These values are considered to be relational to integrated intensity ratios (Id/Ig) according to the Raman spectroscopy and hydrogen-carbon ratios (RBS(H/C)). Consequently, the diamond like carbon for diamond like carbon films is desirable to have an integrated intensity ratio (Id/Ig) of 0.65±0.42. As mentioned above, the integrated intensity ratio presents a ration of diamond components to graphite components measured by the Raman spectroscopy.

After all the measurement results are considered, the sample A is optimal for a diamond like carbon film for the magnetic head according to the present invention. With respect to the film durability, however, the sample B also shows good results.

For more reliably preventing abrasion near the magnetic head element on this magnetic head, a larger thickness is applied to the diamond like carbon film at the slider's rear end relative movement direction against the signal recording surface than to the diamond like carbon film at the front end in the same direction. The larger film thickness may be approximately 10 nm through 12 nm.

What is claimed is:

1. A magnetic head comprising:
    a slider having a surface facing a signal recording surface on a rotated floppy disk, a pair of parallel rails protuberantly provided on said surface in parallel with a tangential direction of a recording track on said signal recording surface, and a tapered ramp edge on each of said rails from a front end of said rails in a movement direction of said slider relative to the signal recording surface with a slant away from said signal recording surface; and
    a magnetic head element provided on one of said rails, wherein said slider is provided with a chamfer formed by polishing between a rear end of said ramp edge and a front end edge of a principal plane of each of said rails, so that said ramp edge is encompassed by said chamfer,
    wherein said chamfer is formed by polishing at least 1 μm in width between the rear end of said ramp edge and the front end edge of the principal plane of each of said rails, and wherein said chamfer at the front end edge of said rail in a movement direction relative to the signal recording surface is wider than said chamfer at a rear end in said movement direction.

2. The magnetic head according to claim 1, wherein said chamfer at the front end edge of said rail in the movement direction relative to the signal recording surface is 1.5 to 1.7 times wider than said chamfer at the rear end in said movement direction.

3. The magnetic head according to claim 1, wherein said chamfer is 40 μm in width at the front end edge of said rail in said movement direction relative to the signal recording surface; and said chamfer is 25 μm in width at the rear end of said rail in said movement direction.

4. The magnetic head according to claim 1, wherein a diamond-like carbon film is formed at least on a side of said rail facing the signal recording surface.

5. The magnetic head according to claim 4, wherein the diamond-like carbon film at the rear end of said rail in said movement direction signal recording surface is thicker than the diamond-like carbon film at the front end edge of said rail in said movement direction.

6. A manufacturing method for manufacturing a magnetic head on a slider having a surface facing a signal recording surface on a rotated floppy disk, a pair of parallel rails protuberantly provided on the surface in parallel with a tangential direction of a recording track on said signal recording surface, a tapered ramp edge on each of the rails from a front end of the rails in a movement direction of the slider relative to the signal recording surface with a slant away from said signal recording surface, and a magnetic head element provided on one of the rails, the method comprising the steps of:

polishing to form a chamfer at a ridge formed between a rear end of said ramp edge on said rails and a front edge of a principal plane on each of said rails and polishing each side edge of said rails to form a chamfer;

forming said chamfer at a front end of each of said in a movement direction of the slider relative to the signal recording surface to be wider than said chamfer at a rear end in said movement direction, so that the ramp edge is encompassed by said chamfer; and forming each said chamfer at the front end of said rails in the movement direction relative to the recording surface to be 1.5 to 1.7 times wider than said chamfer at a rear end in said movement direction.

7. The manufacturing method of the magnetic head according to claim 6, comprising the further step of forming each said chamfer to be 40 μm each in width at the front end of said rails.

8. A magnetic disk drive comprising:

a rotating mechanism for rotating a magnetic disk; and a head support mechanism for supporting a floppy head to face a signal recording surface of the magnetic disk rotated by said rotating mechanism;

wherein said magnetic head includes a surface facing said signal recording surface of said floppy disk, a pair of parallel rails protuberantly provided on said surface in parallel with a tangential direction of a recording track on said signal recording surface, a slider having a tapered ramp edge formed on each of said rails from a front end in a movement direction of said slider relative to said signal recording surface with a slant away from said signal recording surface, and a magnetic head element provided on one of said rails, wherein said slider is provided with a chamfer formed by polishing between a rear end of said ramp edge and a front end of a principal plane of each of said rails, so that the ramp edge is encompassed by said chamfer, wherein said chamfer is formed by polishing 1 μm or more in width between the rear end of the tapered ramp edge and the front end edge of the principal plane on each rail, and wherein a polished chamfer is formed on each side edge of said rails, and said chamfer at the front end of said rail is wider than said chamfer at the rear end of said rails.

9. The magnetic disk drive according to claim 8, wherein said chamfer at the front end of each of said rails is 1.5 to 1.7 times wider than said chamfer at the rear end of said rails.

10. The magnetic disk drive according to claim 8, wherein said chamfer is 40 μm in width at the front end of each of said rails, and said chamfer is 25 μm in width at the rear end of said rails.

* * * * *